United States Patent Office 3,020,243
Patented Feb. 6, 1962

3,020,243
PREPARATION OF GEL EXTRUDATES
Ronald E. Reitmeier, Middletown, Ky., assignor to Catalysts and Chemicals Inc., Louisville, Ky., a corporation of Delaware
No Drawing. Filed May 22, 1958, Ser. No. 736,989
2 Claims. (Cl. 252—465)

This invention relates to the preparation of gel metal oxide catalysts. The invention relates more particularly to the preparation of catalytic masses which possess the property of cohering in self supporting units in which the form of the units permits the catalyst and catalyzed material to come into an effective contact during the reaction. More particularly the invention relates to the preparation of gel catalyst extrudates of uniformly small size.

One of the major problems which has confronted the industry has been that of bringing the catalyst into intimate, effective contact with the charge material and of maintaining the catalyst surface so that this intimate contact may be continued for a satisfactorily long period of time. According to one theory widely accepted (see "Catalysis" by Berkman, Morrell and Egloff) catalysis is a surface phenomenon. Catalytic activity is believed to be due to unsatisfied valence forces in metallic or metallic oxide of atoms by virtue of their position with respect to other atoms in the material. These forces are believed to be smallest within the body of the unit and greater near or at the surfaces where these forces are unbalanced and greatest on the edges and points. An amorphous material is generally believed to be more catalytically active than the crystalline form since in crystals secondary forces or valences are considered to be directed toward the crystal's center, whereas in amorphous bodies these valences are directed toward the outside of the unit of the material.

Such amorphous materials are commonly referred to as gels. Gel formation as a method of catalyst preparation is especially applicable to those catalysts in which the major components are hydrous oxides. In particular, those catalysts containing primarily silica or aluminum are especially amenable to gel formation. However, the oxides of iron, chromium, bismuth, gallium, indium, copper, nickel, beryllium, titanium, zirconium, thorium, cerium, scandium, vanadium, manganese, germanium, tin, tantalum, molybdenum, and tungsten may be prepared in the form of gels by well known techniques.

Such techniques generally involve the preparation of stable hydrosols which are sprayed into heated air to form microspheroidol gel particles. In instances where stable hydrosols cannot be formed, the sensitive hydrosol is allowed to gel and the gel after drying is ground or broken and classified according to size. However, the resulting product is not entirely satisfactory in that either the catalytic activity is not as great as might be desirable or the product undergoes an undesirable amount of attrition with concomitant formation of excess catalyst fines. Still another problem is encountered when it is desired to produce a catalyst which comprises a substantial amount of crystalline material—that is to say—a catalyst in which the carrier is in a gelatinous form and the catalytic constituent is in a crystalline form. It has been proposed to incorporate the crystalline catalytic precursor by occlusion with the gel and thereafter to treat the material as with an acid or base to activate such precursor in situ or to impregnate the pellet after the shaping operation. The former method is disadvantageous in that the total operation is involved and tedious and often does not effect optimum dispersion of the catalytic constituents. The latter method is complicated by the tendency of many otherwise suitable gels to shatter upon contact with aqueous impregnating solutions. Another method of preparing catalyst heretofore employed is that of tabletting a granular or powdered catalyst material into various shapes in an endeavor to insure the material retaining the resulting shape during reaction and regeneration. These forms may be rods, cylinders, spheres, rings, etc. in various shapes, sizes, and proportions. There are three main reasons for this procedure.

(1) To permit easy handling.
(2) To increase the contact surface of a given amount of catalyst in a given amount of reactor space.
(3) To improve the passage of fluids through the catalyst while increasing the time between regenerations.

When only small quantities of catalyst are required as for experimental work in a laboratory, it makes little difference which method of catalyst preparation is used. However, in commercial scale plants when large quantities of catalyst are required, the cost of preparing the catalyst is an important item. Thus the tabletting of fifty thousand pounds of catalyst in sizes of $\frac{1}{16}$ to $\frac{1}{8}$ inch requires so much time and involves so much wear on the dies as to make the operation economically undesirable. Extrusion of catalysts of this size is complicated by the tendency of the pellets, formed by cutting the extrudate, to deform and stick together into unusable agglomerates. The threads of material emerge from the die plate and upon contact with the cutting knife twist together in a manner analogous to spaghetti entwined about the tines of a fork. This may be alleviated to some extent by utilizing only a portion of the available apertures in the die plate, i.e., by closing from one half to three quarters of said apertures so as to utilize for example from 16 to 32 apertures in a die plate containing 64. In this manner the extrudates are more distantly spaced from each other and the tendency to form said agglomerates is reduced. At the same time, however, the production capacity is reduced from one half to three quarters.

Nevertheless the production of small physically stable uniform extrudates is very desirable. Thus Blue et al. (see Industrial and Engineering Chemistry 44, 2710–2716 (1952), reported that on a laboratory scale using a chromia-alumina catalyst containing about 12% chromium oxide that about a 40% greater conversion of butane to butylene was obtained with particle sizes in the range of from 40–60 mesh as compared with $\frac{1}{8}$ inch pellets. It has been demonstrated in innumerable reactors, such as the steam hydrocarbon reforming reaction and the carbon monoxide conversion reaction among others that the amount of catalyst necessary for a specified conversion is proportional to the particle size of the catalyst. (See for example the excellent discussion by Wheeler in Emmett, editor, Catalysis, vol. II (1955).) I have found that with a cobalt moly alumina catalyst prepared in accordance with this invention for example that an increase of from 2–4 percent organic sulfur conversion may be effected by utilizing $\frac{1}{8}$ inch extrudates rather than $\frac{3}{16}$ inch extrudates.

Accordingly, an important object of this invention is to prepare catalysts composed of a portion of a gel and a portion of a crystalline substance in the form of physically stable self supporting units.

A further important object of this invention is to provide a method for producing such catalysts in the form of extrudates of uniform size.

Another object of this invention is to provide a method of extruding gelatinous catalytic material to form stable and uniform catalyst units.

According to this invention catalysts are prepared by admixing a hydrous metal oxide gel with a crystalline substance and extruding the plastic admixture to form shaped pellets. Upon drying and calcination, the pellets shrink to the desired size. In one specific embodiment the hydrous gel is produced by peptizing a hydrated alumina admixed with a non-peptizable carrier to form an extrudable mass.

The phenomenon of gel formation occurs as a special case of precipitation. The preparation of a particular gel, however, requires close control over process conditions in order to prevent formation of a mixture of hydrogel and gelatinous precipitate. In some instances it is advantageous to peptize the fresh precipitate with an acid or base in order to insure complete gel formation. With the more amphoteric metals such as hydrated alumina complete peptization may be effected with aged dry gels so long as the material has not been substantially dehydrated.

The hydrous gels employed may be either those of the oxides of iron, chromium, bismuth, aluminum, gallium, indium, copper, nickel, beryllium, titanium, zirconium, thorium, cerium, scandium, vanadium, manganese, silicon, germanium, tin, tantalum, molybdenum, tungsten, and the like or mixtures of such oxides.

The hydrous oxide gels of iron, chromium, aluminum, nickel, copper, beryllium, vanadium, and manganese for example, may be prepared by treating a solution of a soluble salt of one of the aforesaid metals with a solution of an alkaline substance, as for example, an alkali such as sodium, potassium, or ammonium hydroxide or an alkali metal salt such as sodium or potassium carbonate of such concentration that the resulting solution is alkaline. The concentration and amount of such alkaline reagent should be such as to be about 0.01% to 0.1% and preferably 0.02% to 0.05% by weight in excess of that required to completely neutralize the solution of the soluble metal salt.

The hydrous oxide gels of silicon, titanium, tantalum, molybdenum, tungsten, and vanadium pentoxide ($V_2O_5$) may be prepared by reacting a solution of an acidic substance as for example, an acid such as hydrochloric, sulphuric, nitric, or an acid salt of another of said metals or non-metals in such proportions and concentrations as to produce a reaction mass which is slightly acid. The proportions and concentrations of the reacting ingredients should be such that the acidity of the mass ranges from 0.05 N to 0.9 N acid and preferably from 0.05 N to 0.5 N. A gelatinous precipitate or sol forms which coagulates as a whole after a time to a jelly or a hydrogel.

The hydrogel thus formed is mixed together with a crystalline material such as activated alumina, activated titania, activated zirconia, clay or non gelatinous siliceous adsorbents to form a plastic mass suitable for extrusion. The amount and nature of the adsorbent determines the size and to some extent the strength of the dried and calcined catalyst. If desired the catalytic constituents may be admixed with the adsorbent and gel. Alternately the adsorbent may first be impregnated with salts of catalytic metals or the calcined extrudate may be impregnated with said salts after the extrusion, drying and calcining operations. Thus, for example, an admixture of about 30 parts of activated alumina and about 60 parts of alumina gel (calculated on the dehydrated basis) and containing about 90 parts by weight of water when extruded as extrudates of .25 inch shrink upon drying to about 0.189 inch. If 10 parts of kaolin and 20 parts of activated alumina are utilized with 60 parts of alumina gel, the extrusions of the same size shrink to about 0.182 inch. If 30 parts of kaolin are utilized with 60 parts by weight of alumina gel (calculated on the dehydrated basis) the 0.25 inch extrudates shrink to about 0.17 inch. Thus the size of the finished extrudate maybe varied by varying the amount of crystalline material added. The amount of crystalline material maybe varied within rather wide limits. I have obtained good results utilizing from about 25–35% by weight of materials such as activated alumina. However, if the activated alumina exceeds the weight of alumina gel (on the dehydrated basis) the physical strength of the finished extrudate suffers. I have found that a plastic material such as kaolin may be utilized in much greater portion than the non plastic adsorbents. Further, the kaolin upon calcination imparts its own strength to the finished extrudates and in addition provides added heat stability under reaction conditions. Preferably, I prefer to utilize crystalline high surface area adsorbents in conjunction with plastic clays such as the primary and secondary kaolins admixed with the gels to provide both surface area and strength in the catalyst pellets.

Reference is now made to examples of catalyst preparation which will further illustrate the nature and scope of this invention.

EXAMPLE 1

Catalysts containing on a final basis 3.5% cobalt oxide, 10.0% molybdenum trioxide and 86.5% alumina were prepared as follows:

200 parts by weight of $MoO_3$, 692 parts by weight of activated alumina and 1300 parts by weight of hydrated alumina (containing 28% water by weight) were dry mixed in a Simpson mix muller for about ten minutes. A cobalt nitrate solution containing 274 parts by weight of cobalt nitrate dissolved in water was added to the mixture which was then mulled for five more minutes. An aqueous nitric acid solution containing about 13.8 parts by weight of 62% nitric acid was added with an additional 141 parts by weight of hydrated alumina and this mixture was mulled for about ten minutes until a plastic doughy mass was formed due to the gelling of the hydrated alumina. This was extruded as 0.25 inch x 0.25 inch extrusions. These extrudates were dried for three hours at 300° F. and calcined for one hour at 500° F. and for eight hours at 950° F. It was found upon calcination that the catalyst had shrunk to 0.189 inch x 0.189 inch extrudates and had a side crush strength in the range of about 35–40 pounds.

EXAMPLE 2

Catalysts containing on a final basis 2.0% cobalt oxide, 10.0% molybdenum trioxide, 10% kaolin, and 78% alumina were prepared as follows:

200 parts by weight of $MoO_3$, 461 parts by weight of activated alumina, 231 parts by weight of kaolin and 1,300 parts by weight of hydrated alumina (containing 28% water by weight) were dry mixed in a Simpson mix muller for about ten minutes. A cobalt nitrate solution containing 157 parts by weight of cobalt nitrate dissolved in water was added to the mixture which was then mulled for five more minutes. An aqueous nitric acid solution containing about 13.8 parts by weight of 62% nitric acid was added with an additional 141 parts by weight of hydrated alumina and this mixture was then mulled for about ten minutes until a plastic doughy mass was formed due to the gelling of the hydrated alumina. This was extruded as 0.25 inch x 0.25 inch pellets. These pellets were dried for three hours at 300° F. and calcined for one hour at 500° F. and eight hours at 950° F. The calcined extrudates shrunk in size to 0.182 inch pellets which had a side crush strength of about 55–60 pounds.

EXAMPLE 3

Catalysts containing on a final basis 2.0% cobalt oxide, 10.0% molybdenum trioxide, 30% kaolin and 58.0% alumina were prepared as follows:

200 parts by weight of $MoO_3$, 692 parts by weight of kaolin and 1,300 parts by weight of hydrated alumina (containing 28% by weight of combined water) were dry mixed in a Simpson mix muller for about ten minutes. A cobalt nitrate solution containing 157 parts by weight of cobalt nitrate dissolved in water was added to the mixture which was then mulled for five more minutes. An aqueous nitric acid solution containing about 13.8 parts by weight of 62% nitric acid was added with an additional 141 parts by weight of hydrated alumina and this mixture was mulled until a plastic mass was formed due to the gelling of the hydrated alumina.

This was extruded as 0.25 inch x 0.25 inch extrudates which were dried for three hours at 300° F., calcined for one hour at 500° F., and for eight hours at 950° F. It was found that the catalyst had shrunk to 0.17 inch x 0.17 inch pellets. These pellets had a side crush strength of about 70 to 75 pounds.

It will be noted that the addition of the kaolin effected a greater reduction in size of the extrudates than did the activated alumina. Notwithstanding the smaller diameter of the extrudates, those which contained kaolin were considerably stronger. In addition it was noted that the pellets containing kaolin tended to break with a conchoidal fracture rather than shatter to a powder. Therefore, from a practical standpoint, those pellets possess a higher level of mechanical strength than is indicated by the crush strength.

The catalysts of the foregoing examples were tested for desulfurization activity with a Kuwait diesel oil containing about 1.6% organic sulfur. The reactor comprised a jacketed iron pipe with an internal diameter of ¾ inch. Sulfur determinations were made by the method of Hinsvark and O'Hara as reported in Analytical Chemistry 29, 1318–22 (1957). The data are tabulated below.

Table I

Conditions:
- Temperature _____ 700° F.
- Pressure _____ 600 p.s.i.g.
- Hydrogen flow rate _____ 2000 s.c.f.b.
- Liquid space velocity _____ 1.5.
- Feed stock _____ Kuwait diesel oil.
- Organic sulfur _____ 1.6% by weight.

| Example No. | 1 | 2 | 3 |
|---|---|---|---|
| Catalyst Composition in percent by weight: | | | |
| $CoO$ | 3.5 | 2.0 | 2.0 |
| $MoO_3$ | 10.0 | 10.0 | 10.0 |
| $Al_2O_3$ | 86.5 | 78.0 | 58.0 |
| Kaolin | | 10.0 | 30.0 |
| Catalyst size in inches | 0.189 x 0.189 | 0.182 x 0.182 | 0.17 – 0.17 |
| Side crush Strength in pounds | 35–40 | 55–60 | 70–75 |
| Organic Sulfur Conversion, percent | 90 | 90 | 75 |

While the examples have been limited to alumina gel prepared by peptization of hydrated alumina, and to the cobalt moly catalyst as utilized in the desulfurization of petroleum fractions the invention is in no manner limited thereby. Any of the gel forming metal oxides or hydroxides may be advantageously mixed with non gelatinous materials to obtain the advantages of control over the size of the extrudates, control over the strength of the extrudates and control over the pore and surface characteristics of the extrudates.

Obviously many modifications and variations such as may occur to those skilled in the art may be made without departure from the spirit and scope of this invention. Therefore, only such limitations as appear in the appended claims should be imposed.

I claim:

1. A method of preparing an extruded molybdenum oxide-cobalt oxide catalyst supported on a carrier of a mixture of alumina and kaolin, said catalyst having the cobalt oxide uniformly dispersed in the carrier, being resistant to shattering and being dimensionally stable in use at elevated temperature for desulfurization and hydrocarbon conversion, comprising mixing (1) molybdenum oxide in dry form in an amount of from about 3% to about 20% of the total weight of the mixture (2) about 25–35% by weight of dry activated alumina, (3) dry kaolin in an amount of about ½ of said activated alumina, and (4) the remainder consisting of hydrated alumina, said hydrated alumina containing about 28% by weight of combined water and being in the dry state, there being present a greater amount of said hydrated alumina than said activated alumina, thereafter adding a sufficient amount of water containing a cobalt salt dissolved therein capable of being converted to cobalt oxide promoter on calcining said catalyst, the amount of said cobalt oxide varying from between about 2 to about 3.5% while continuing said mixing, adding aqueous nitric acid to form a plastic doughy mass, extruding said mass, drying said extrudate at a temperature of from 300–500° F. and calcining at a temperature of about 700–1200° F. to effect uniform shrinkage of the extruded catalyst.

2. The method of claim 1 wherein there is present between about 2% to about 3.5% cobalt oxide and 10% molybdenum oxide in a finished catalyst.

References Cited in the file of this patent

UNITED STATES PATENTS

| | | |
|---|---|---|
| 2,487,466 | Nahin | Nov. 8, 1949 |
| 2,665,258 | Lebeis | Jan. 5, 1954 |
| 2,813,837 | Holden | Nov. 19, 1957 |
| 2,830,960 | Broomhead | Apr. 15, 1958 |